US011476693B2

(12) United States Patent
Restrepo

(10) Patent No.: US 11,476,693 B2
(45) Date of Patent: Oct. 18, 2022

(54) SYSTEM AND METHOD FOR OPTIMIZING STORAGE AND CONSUMPTION OF POWER ACCORDING TO TIERED TIME-BASED CRITERIA

(71) Applicant: Sonnen, Inc., Tucker, GA (US)

(72) Inventor: Carlos Restrepo, Atlanta, GA (US)

(73) Assignee: Sonnen, Inc., Stone Mountain, GA (US)

( * ) Notice: Subject to any disclaimer, the term of this patent is extended or adjusted under 35 U.S.C. 154(b) by 212 days.

(21) Appl. No.: 16/841,228

(22) Filed: Apr. 6, 2020

(65) Prior Publication Data

US 2020/0373776 A1 Nov. 26, 2020

Related U.S. Application Data

(60) Provisional application No. 62/850,389, filed on May 20, 2019.

(51) Int. Cl.
*H02J 7/00* (2006.01)
*H02J 3/38* (2006.01)
(Continued)

(52) U.S. Cl.
CPC ........ *H02J 7/00712* (2020.01); *G05B 19/042* (2013.01); *H02J 3/32* (2013.01); *H02J 3/381* (2013.01); *H02J 7/0048* (2020.01); *H02J 7/0071* (2020.01); *G05B 2219/24136* (2013.01); *G05B 2219/2639* (2013.01); *H02J 2300/24* (2020.01)

(58) Field of Classification Search
CPC .......... H02J 7/00712; H02J 3/32; H02J 3/381; H02J 7/0048; H02J 7/0071; H02J 2300/24; H02J 3/004; H02J 2300/22; G05B 19/042; G05B 2219/24136; G05B 2219/2639; Y02E 70/30; Y02E 10/56; Y04S 10/50

See application file for complete search history.

(56) References Cited

U.S. PATENT DOCUMENTS

| 2009/0326729 | A1* | 12/2009 | Hakim | .................. G06Q 50/06 700/295 |
| 2011/0210698 | A1* | 9/2011 | Sakai | ..................... B60L 58/12 320/109 |

(Continued)

*Primary Examiner* — Charles R Kasenge
(74) *Attorney, Agent, or Firm* — Clive McClintock

(57) ABSTRACT

Systems and methods of improving storage and consumption of electricity according to time-based tiered criteria are disclosed. An energy storage system controlled by a processor is optionally connected to a utility power grid, a photovoltaic (PV) power source, and/or electrical loads. Time-of-use (TOU) rates (or similar tiered criteria) are input into the processor, which sets charge and discharge profiles according to the criteria, the arrangement of time windows, and the user's preferences. Energy is stored or discharged according to these profiles. Additionally, the energy storage system may record the production and consumption patterns of the user over time, and use this information to modify the profiles for enhanced performance by allowing discharge during non-peak windows. Benefits include reduced electrical cost to the user, reduced strain on the utility power grid during peak consumption hours, and enhanced performance with regard to any other criteria input into the processor.

10 Claims, 7 Drawing Sheets

(51) Int. Cl.
*H02J 3/32* (2006.01)
*G05B 19/042* (2006.01)

(56) References Cited

U.S. PATENT DOCUMENTS

| | | |
|---|---|---|
| 2014/0101476 A1 | 4/2014 | Lu et al. |
| 2015/0097518 A1 | 4/2015 | Bishop et al. |
| 2015/0188482 A1* | 7/2015 | Berkowitz ............... H02J 3/38 320/101 |
| 2015/0355284 A1 | 12/2015 | Prada et al. |
| 2018/0076645 A1 | 3/2018 | Bamberger et al. |
| 2018/0131200 A1 | 5/2018 | Crawford et al. |
| 2018/0233914 A1* | 8/2018 | Miki ................... H02J 7/0068 |

* cited by examiner

* See table 1.

| TABLE 1: PROFILE DEFINITIONS ||||||
|---|---|---|---|---|---|
| Charge Profile | Value | Discharge Profile | Value | Net Profile | Value |
| $C_{P0}$ | 100% | $D_{P0}$ | 0% | $NET_{P0}$ | 100% |
| $C_{P1}$ | 100% - $C_{P0}$ | $D_{P1}$ | 100% - $D_{Pn}$ - $D_{Pn-1}$ - $D_{Pn-2,...,}$ - $D_{P2}$ | $NET_{P1}$ | $C_{P1}$ - $D_{P1}$ |
| $C_{P2}$ | 100% - $C_{P0}$ - $C_{P1}$ | $D_{P2}$ | 100% - $D_{Pn}$ - $D_{Pn-1}$ - $D_{Pn-2,...,}$ - $D_{P3}$ | $NET_{P2}$ | $C_{P2}$ - $D_{P2}$ |
| ... | ... | ... | ... | ... | ... |
| $C_{Pn}$ | 0% | $D_{Pn}$ | 100% | $NET_{Pn}$ | -100% |

FIG 2

SYSTEM AND METHOD FOR OPTIMIZING STORAGE AND CONSUMPTION OF POWER ACCORDING TO TIERED TIME-BASED CRITERIA

TECHNICAL FIELD

The present disclosure belongs to the field of distributed energy resources, and specifically, relates to systems and methods of using energy storage systems to enhancing the efficiency of energy storage and consumption according to time-based, tiered criteria.

BACKGROUND OF THE INVENTION

Renewable energy, in particular photovoltaic (PV) solar energy, has become globally widespread. PV energy systems are frequently connected to an energy storage system (ESS), typically a direct current (DC) battery, to allow for storage and controlled distribution of energy. The ESS is commonly connected to a nearby alternating current (AC) utility grid and/or a local AC energy load.

The typical ESS constantly monitors the production and consumption of energy in a given electrical environment. Energy production generally includes sources such as power produced from the grid, generation of electricity by photovoltaic (PV) cells, electrical generators, and the like. Energy consumption generally includes use of electricity by electric loads such as lighting, electronic appliances, and the like.

If local production of energy from sources like PV exceeds consumption, it is common to distribute or feed electricity back into the utility power grid or other energy resource. Feeding back into the grid may lead to instances where excess energy stresses the grid rather than supports real load demand. Based on the desired application, an ESS acts by storing power from the grid and other production sources or releasing it for consumption or feeding energy back into the grid as excess energy when it is really needed and not necessarily when it is produced.

Four common applications for use of an ESS include self-consumption, peak-shaving, time-of-use mode, and backup. In the case of self-consumption, the ESS will store excess production of energy when it is available and later release it for use by local loads when there is a demand. In the case of peak-shaving, the ESS will store energy and release it based on consumption above a pre-defined limit. In the case of time-of-use, the ESS will store and release energy based on the time of day. The times of day are chosen to minimize draw from the grid during peak use hours to reduce the grid's peak consumption. In the case of backup, the ESS stores energy and passively holds onto it until there is a power failure from the grid, at which time the ESS establishes a local micro-grid that manages power locally, including but not limited to releasing energy for consumption and storing excess locally produced solar or other energy.

When deciding whether to install an ESS, users typically consider the benefits of having locally stored energy available, in addition to the price of the ESS and the potential costs saved by using the ESS. Utility companies have often tried to control the peak use of electricity and therefore manage their own costs by charging more during certain times of day. In many cases the utilities provide electricity with time-based rate structures in which there are multiple time windows with different rates (a.k.a. tariffs). These tiered rate structures are known as time-of-use (TOU) rates.

In instances where there is a differentiation between high-rate and low-rate time windows, it is desirable during a high-rate time window to operate the ESS to (1) avoid charging from the grid, and (2) maximize the consumption of stored energy rather than grid power. Subsequently, there is a need to recharge the batteries as soon as possible to continue to support this action. It is desirable to charge when (1) there is excess of power produced or (2) the system can charge from the grid during a low-rate time window.

Prior implementations of optimized self-consumption operate simplistically. The ESS decides on whether to charge or discharge the batteries based on the current amount of power consumed and power produced. If there is an excess of power the system charges the batteries and discharges if the opposite occurs.

In situations where the utility has provided time-of-use "TOU" rates and time windows based on use-rates are specified, the prior system performs in a similar manner to that just described but also takes into account the variable of time. To the extent possible, the ESS will discharge during the highest-rate time window to avoid consumption of power at a higher tariff.

A drawback of the prior ESS systems and methods is that they operate in a binary fashion, not dynamically, and therefore fail to effectively optimize energy storage and consumption. Specifically, the prior art ESS system stores energy in low-rate times if there is an excess of energy available for storage and it releases energy during high-rate times if there is enough reserve in the batteries to meet existing demand. No other factors during the course of the day are taken into consideration. This can leave a significant amount of battery capacity underutilized. Under these static control principles, the system cannot react properly to sudden changes in consumption habits and recover. This frequently leaves a system unprepared to handle the demands set during a high-rate time, exposing the user to increased energy cost.

The systems and methods of the present invention, described herein, focus on maximizing available stored energy for those high-rate time periods while minimizing the cost of power used to charge the batteries.

BRIEF SUMMARY OF THE INVENTION

It is an object of the present invention to improve the efficiency with which energy storage systems manage incoming and outgoing energy flow. More particularly, it is an object of the present invention to maximize the amount of energy available to support consumption during a specific time window when it is preferred to avoid, as much as possible, the consumption of energy from the grid. This improves efficiency with regard to time-based criteria input into the system, including but not limited to reduced cost with regards to TOU rate criteria.

According to one embodiment of the present invention, an ESS receives a number of inputs and examines the state of the system with respect to the goal of maximizing the charge of the battery and increasing or decreasing the power demand at that time to meet that goal. The ESS considers all available sources of energy including but not limited to local production of solar power by PV cells. The ESS utilizes charge and discharge profiles to ensure that the battery will be fully charged before a specified time window starts. Using the charge and discharge profiles, and taking into account all defined time periods, a target percent state of charge (% SOC) is set for each time period. A comparison is made against the state of the system and the operating time window, taking into account the variation in prices for the energy consumed during such window. Based on this variation, a determination is made as to whether energy should be stored or discharged or a combination of both. The ESS monitors when it can charge the battery from the grid and the amount of power generated from alternative sources such as photovoltaic (PV) plants. This allows the ESS to improve efficiency with regard to any user-specified tiered time-based criteria including, as mentioned above, cost when using TOU rate criteria.

Typical TOU rate structures are simple and are defined by a limited number of high and low energy rate windows during the day. However, the embodiments of the present invention can also be applied to more complex rate structures in which there are multiple time-based windows with multiple energy tariffs. In the former, a simple series of rules can be applied to each window (i.e. charge only on low-rate period, discharge only on high-rate period). In the latter, a function-based approach can be applied to allow for a more dynamic management of energy depending on the cost of the energy within those different time windows.

In one embodiment of the present invention, a defined time-based tier structure for TOU rate or other criteria is input into the ESS. The system will recognize each time window and rank them from lowest to highest in terms of criteria priority. For example, in the case of TOU rates the lowest (cheapest) time window will be considered the off-peak time windows and will be the timeframe in which the ESS optimally charges the batteries from the cheapest source, including PV power up to 100% of its total energy capacity. The systems and methods take into account the amount left in the time window to complete the charging task, in addition the required amount of energy need to completely charge the batteries (100% SOC) before the end of the period.

Accordingly, the ESS serves to maximize the energy stored in the batteries prior to the beginning of the most expensive time window, at which time the batteries release the energy stored to supply power for consumption of the user. This maximizes the use of stored energy and reduces consumption cost from the grid when consumption from the grid is least desirable.

According to another embodiment of the present invention, the ESS records the user's typical consumption and production values throughout the day, and uses this information to modify existing charge and discharge profiles. This further improves efficiency with regard to the criteria being used over time.

According to yet another embodiment of the present invention, the ESS anticipates off-peak consumption by large loads like electric vehicle (EV) charging stations, and uses this information to modify existing charge and discharge profiles to ensure that the designated % SOC is met during the off-peak time period(s).

BRIEF DESCRIPTION OF THE DRAWINGS

FIG. 2 is table showing profile definitions for the dynamic charge, discharge, and net profiles in accordance with one embodiment of the present invention.

DETAILED DESCRIPTION OF THE INVENTION

The invention relates generally to systems and methods of enhancing the efficiency of an energy storage system (ESS) with respect to a defined set of tiered, time-based criteria. Charge and discharge profiles are defined to ensure that the battery will be fully charged before a specified time window starts. A target percent state of charge (% SOC) is set for each time period. Based on a comparison between the state of the system, the operating time window, and tiered time-based criteria, a determination is made as to whether energy should be stored or discharged or a combination of both. The ESS monitors when it can charge the battery from the grid and the amount of power generated from alternative sources such as photovoltaic (PV) plants. The ESS may also record the user's typical consumption and production values throughout the day, or anticipate off-peak consumption by large loads like electric vehicle (EV) charging stations, and use this information to modify existing charge and discharge profiles.

Figure 1A:
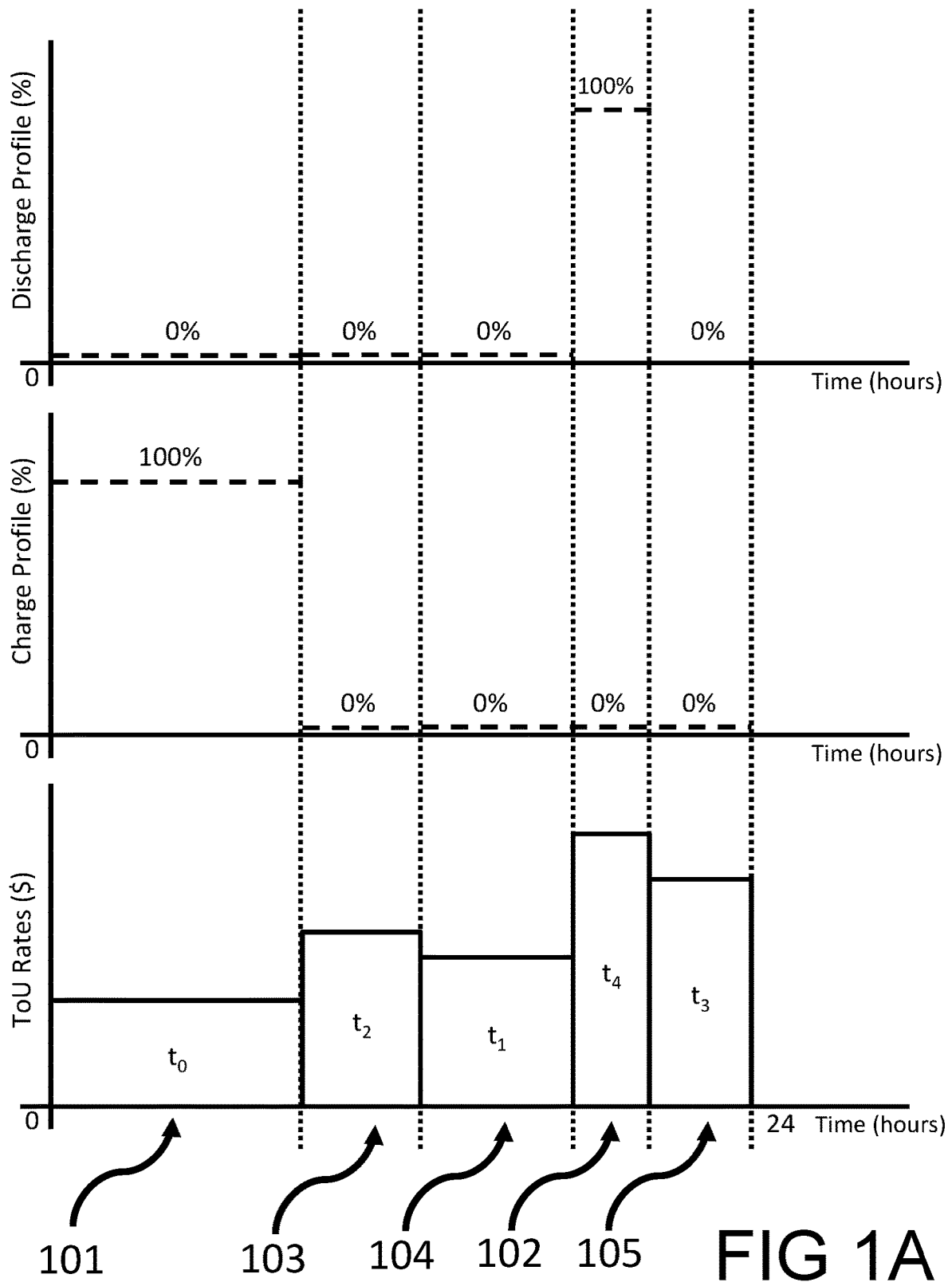
FIG. 1A is a chart showing a simplified charging profile designed to charge at the window of the lowest tiered, time-based criteria and discharge at window of the highest tiered time-based criteria.
Figure 1B:
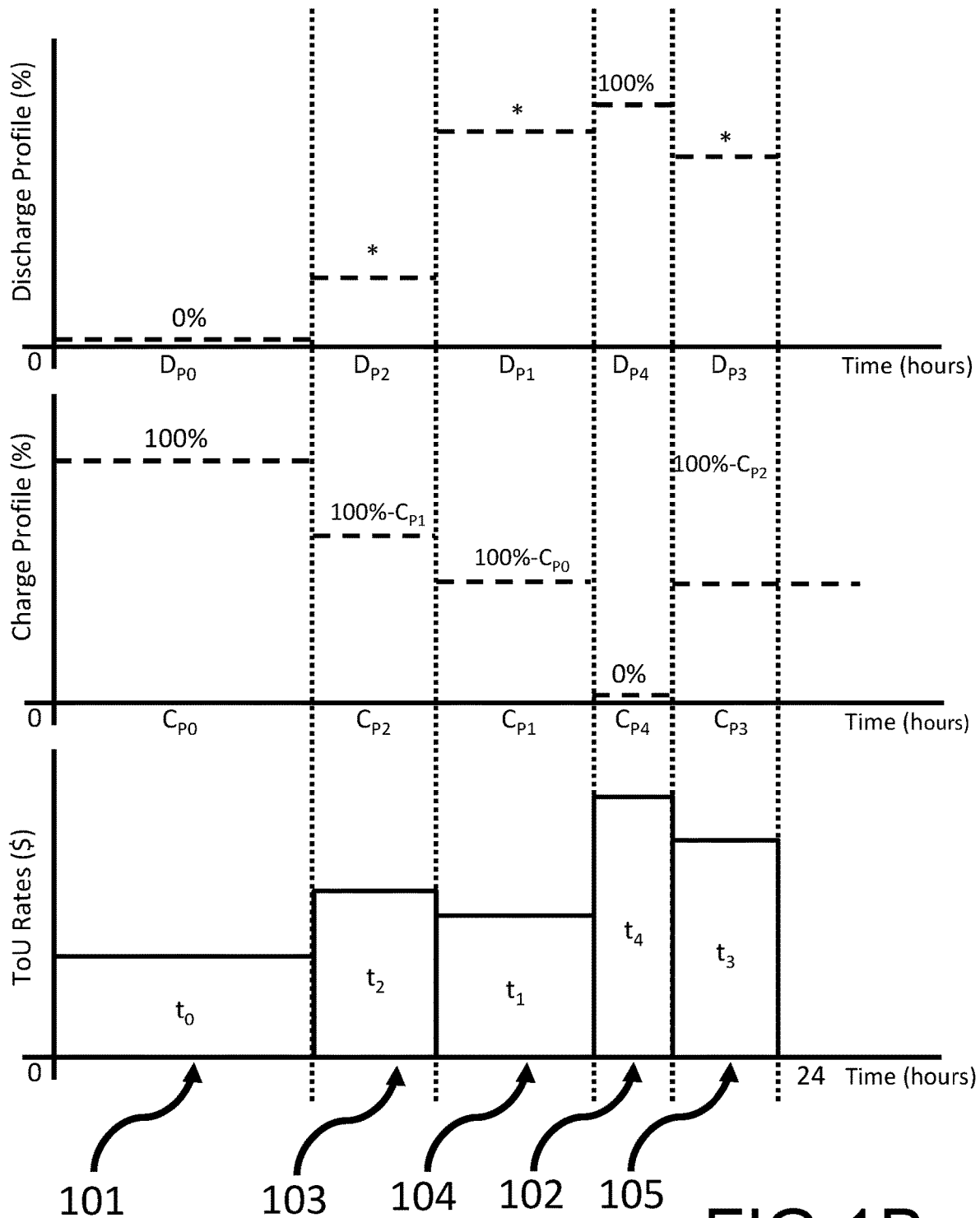
FIG. 1B is a chart showing an optimized dynamic charging profile for use with tiered, time-based criteria in accordance with one embodiment of the present invention.

FIGS. 1A and 1B respectively provide a simplified and an optimized peak-ready example, where there are different time windows with different tiered, time-based criteria, depicting the embodiment in which TOU rates are set by the utility. Each time window is defined as t0, t1, t2 . . . t4, etc., and based on their cost ranking a method can consider a series of charge and discharge profiles that will describe the allowances or limits to do so in each defined time window. FIG. 1A shows a simple approach where the system only considers both the lowest tariff time window 101 and highest tariff time window 102 as charge and discharge opportunities respectively while it remains idle during the other "in-between" windows 103, 104, and 105. This represents peak-time ready TOU optimization.

FIG. 1B shows an optimized alternate embodiment of the present invention in which, depending on the way energy is consumed and produced, the system will optimize to charge the batteries most at the lowest tariff time window 101 and optimize to discharge the batteries most at the highest tariff time window 102. This optimization is complemented with proper estimation of net consumption profiles to further anticipate how much can be charged or discharged within a specific time window. Each of the time windows 103, 104, and 105 has its own unique charge, discharge, and net profiles. Thus, during time windows 103, 104, and 105, the system continues to operate actively to enhance efficiency of the tiered time-based criteria while preparing for the next high tariff time window. The estimation of net consumption can be obtained in multiple ways including traditional forecasting methods based on historic data.

The process of optimizing the time windows in accordance with one embodiment of the present invention involves structuring the criteria data in ways that helps dissect the different time windows. As an example, consider the embodiment built around a set of pre-defined rate structure for energy consumed from the utility grid, depicted in FIG. 1B. The utility's rate structure is time-based and in each time window the utility has assigned a specific price per kWh. This can be characterized in a simple array structure composed of TOU objects covering a series of time windows within a 24-hour period:

$T_{TOU}=[t_0, t_1, \ldots, t_n]$, where n is the number of TOU objects.

Each of the TOU objects in this embodiment is defined by the rate and time boundaries associated with each time window. The index of each TOU object in this embodiment is arranged to match the ranking of each time window based on an increase in rate price, such that $t_0$ is the lowest and $t_n$ is the highest and most expensive time window.

Within each time window in this embodiment, charging and discharging profiles are allocated to inform how the ESS should behave during these windows. This helps address conditions where the sequence of time windows is not chronological. These profiles can be characterized similarly as:

$C_P=[C_{P0}, C_{P1}, \ldots, C_{Pn}]$
$D_P=[D_{P0}, D_{P1}, \ldots, D_{Pn}]$

C is for charging, and D is for discharging.

Additionally, $NET_P=[NET_{P0}, NET_{P1}, \ldots, NET_{Pn}]$ is the net profile calculation based on the difference between the charge and discharge profile, but which may be optionally adjusted in multiple ways including traditional forecasting methods based on historic data.

Individual charge profiles, discharge profiles, and net profiles for the time windows between $t_0$ and $t_n$ are dependent on the profiles for the other time windows. The definitions of the individual charge/discharge/net profile instances are further described as set forth in Table 1 of FIG. 2. Using these profiles, the ESS of this embodiment can be set to optimize the overall price of production and consumption across the time periods $t_0$ to $t_n$. The charging profile calculated for any given time window takes into account what charging can or has been done in the time window with the next lowest tiered criteria. If this information can be obtained from the current daily cycle, the actual (measured) charging profile should be used in the calculation of the current time window. If this has not yet occurred (meaning that the lower tariff windows occurs later in the current daily cycle) an estimated amount should be used. This estimated amount should be based on historical data or other tools used for proper forecasting. A similar approach applies to the discharging profiles. For each of the discharging profiles, the system looks at how much battery capacity must be kept in reserved to support time windows that are in a higher criteria tier. In other words, the discharging profile for the current time window must only use what is not needed for higher criteria tier windows. This capacity allowance use the actual amount this has taken, if any of the higher criteria tier windows has already occurred during the current daily cycle or use estimated data if this is yet to occur during the same cycle. This estimated amount should be based on historical data or other tools used for proper forecasting.

Figure 3:
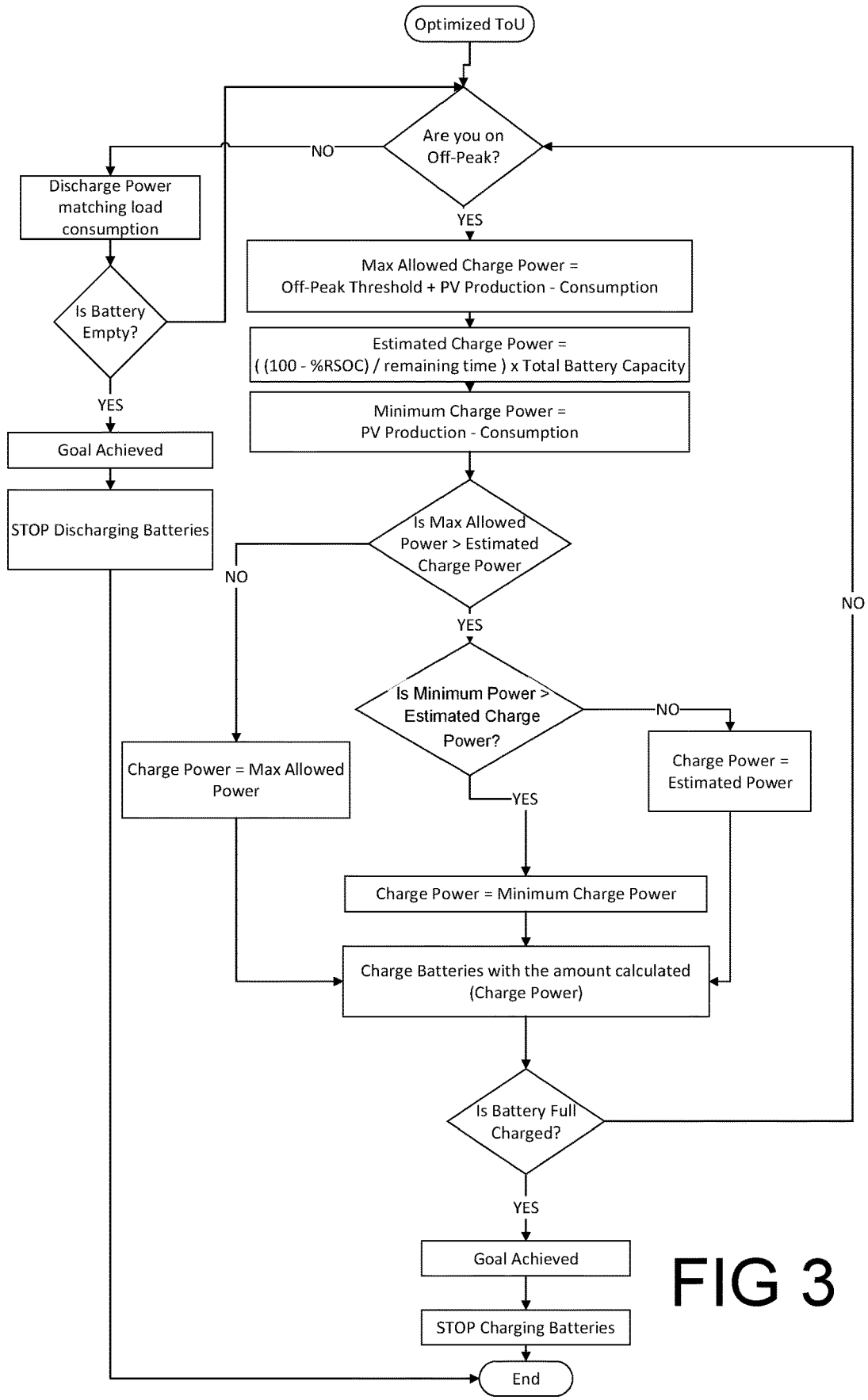
FIG. 3 is a block diagram showing a charging logic in accordance with a simplified embodiment of the present invention.

FIG. 3 is a block diagram showing the flow of logic for a simplified embodiment of the present invention having only a high and a low tiered time-based. During the off-peak time window, the system will constantly evaluate the amount of energy required to charge the system before the peak period time begins. The system will determine the amount of charge required based on either the absolute limit (based on self-consumption optimization) or a lesser amount that would at least cover, excess PV production or the desired power amount pulled from the grid, the energy needed to fully charge the batteries.

For this, the algorithm must continue to consider the different off-peak and peak time windows. A desired maximum allowed power cap is set for power consumed by using an off-peak power threshold. In other words, the total amount of power allowed should be limited to this cap amount while taking into consideration, excess PV production plus allowed power to charge the batteries. The maximum power cap is typically designed to ensure that the overall net consumption of the system (load consumption+ battery consumption offset by PV production) does not exceed a level of power above a set limit. This limit is set by the utilities in order to curtail consumption and avoid peak-demand charges. The minimum power calculated is the excess power produced by PV above the local consumption, which is available for charging.

Figure 4:
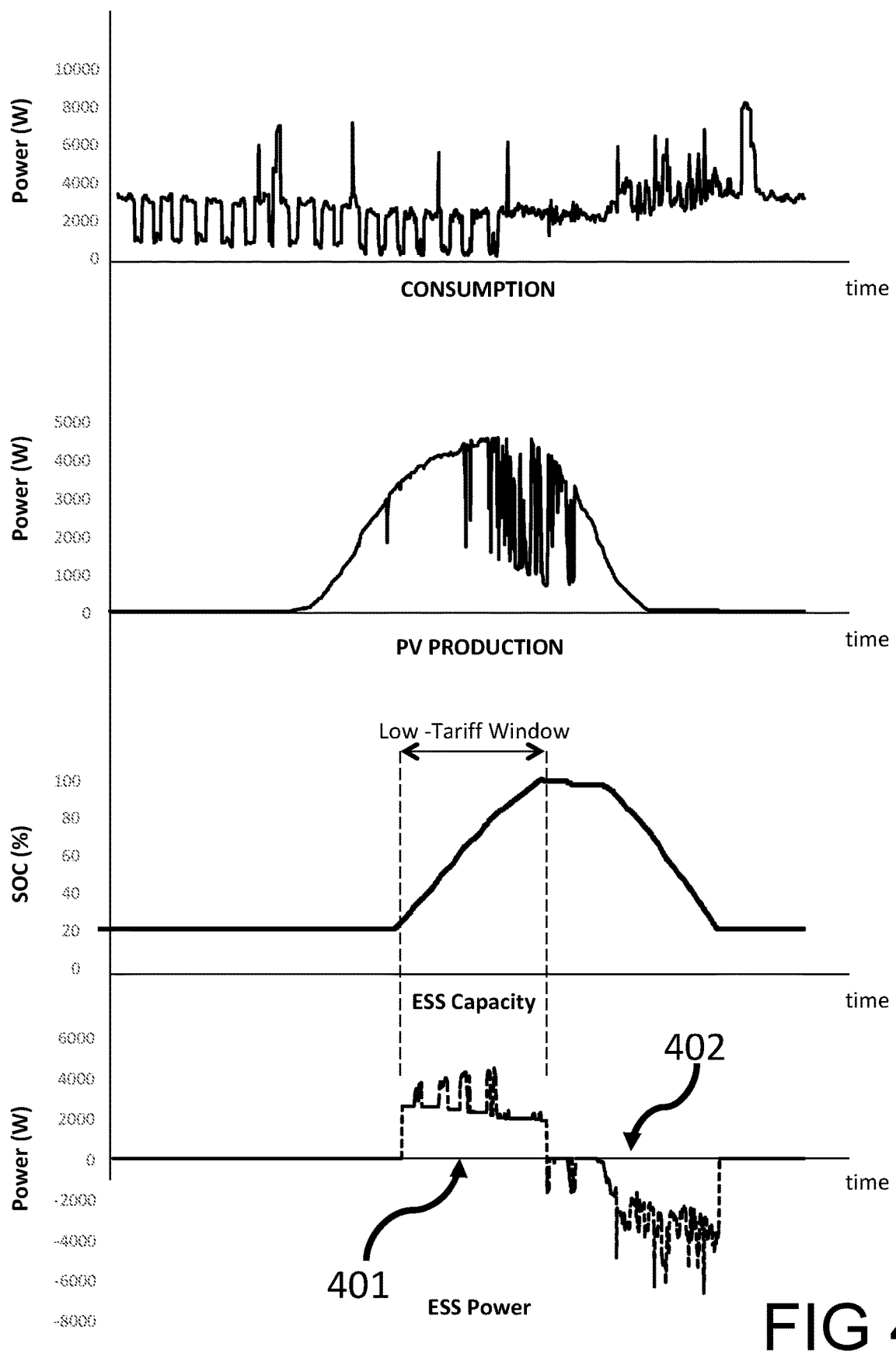
FIG. 4 is a chart showing a recorded example of the Consumption, PV Production, ESS Capacity, and ESS Power for an ESS unit operating for a day in accordance with a simplified embodiment of the present invention.

FIG. 4 is a chart showing a recorded example of the Consumption, PV Production, ESS Capacity, and ESS Power for an ESS unit operating for a day in accordance with a simplified embodiment of the present invention. During the low tariff window 401 the ESS Capacity increases rapidly, such that it has achieved 100% immediately prior to the start of high tariff window 402.

Figure 5A:
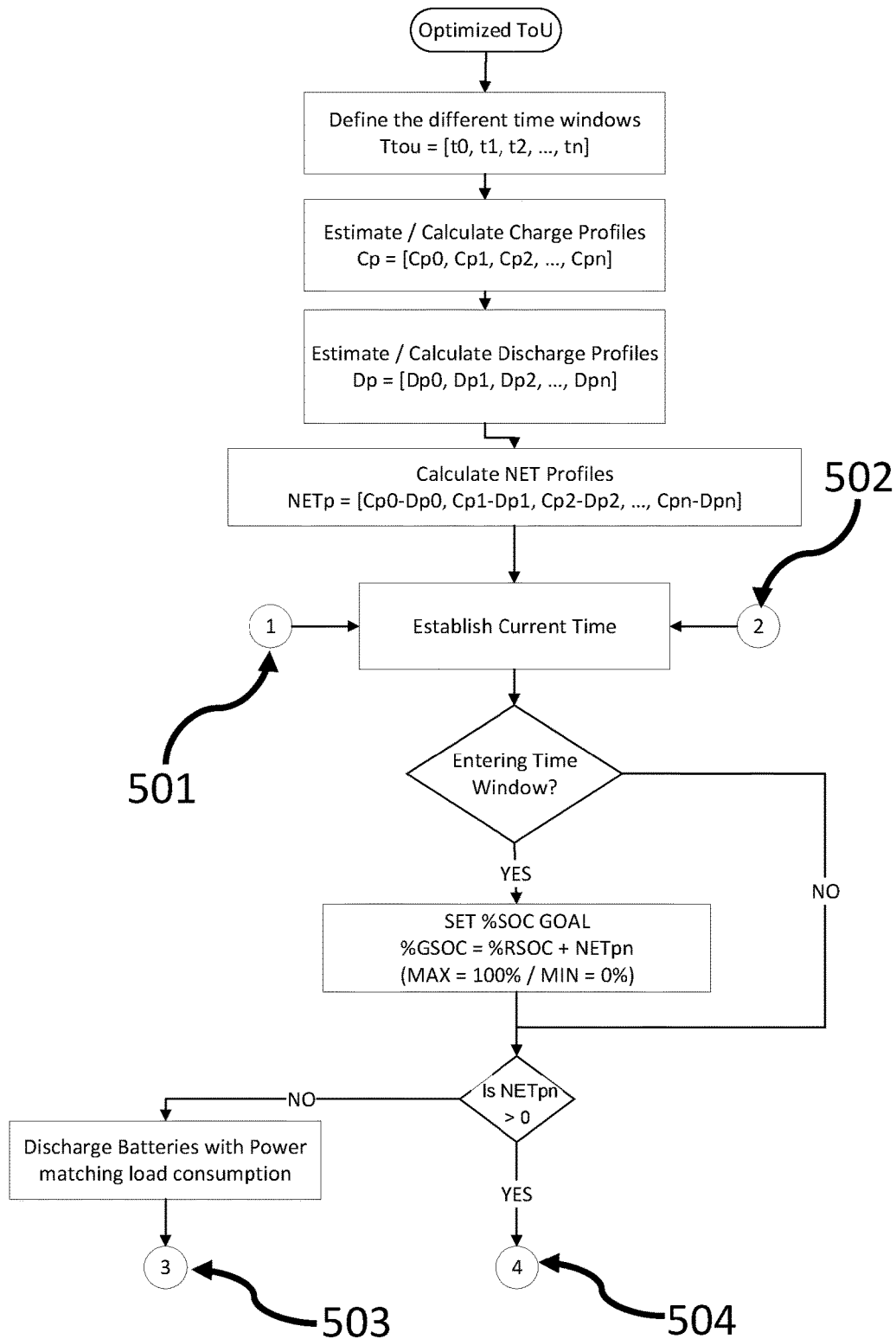
FIG. 5A is a block diagram showing a first portion of a charging and discharging logic in accordance with an optimized embodiment of the present invention.
Figure 5B:
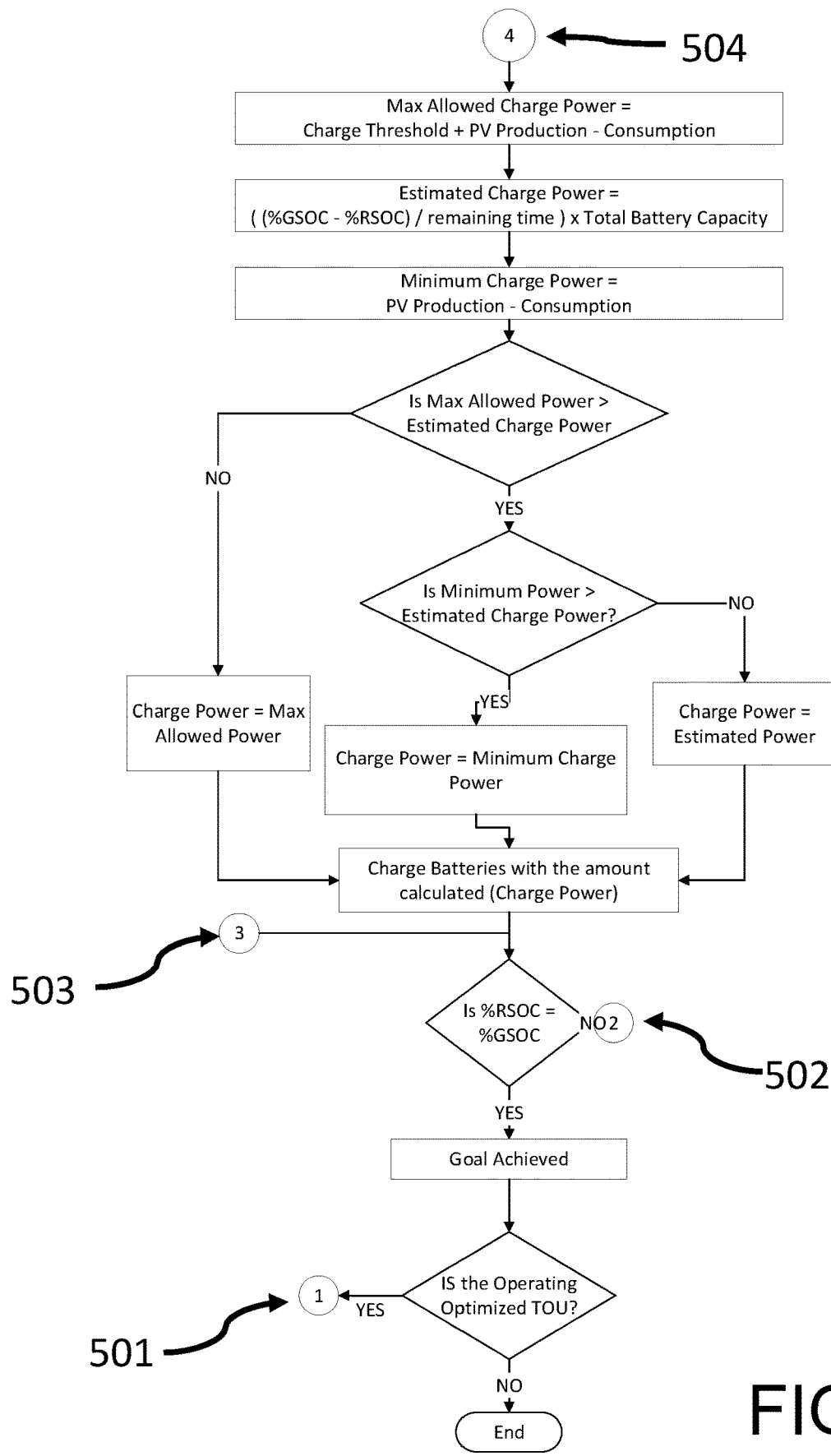
FIG. 5B is a block diagram showing a second portion of a charging and discharging logic in accordance with an optimized embodiment of the present invention.

FIGS. 5A and 5B are block diagrams showing the flow of logic for a dynamic, optimized embodiment of the present invention in which charge and discharge profiles are set for each of any number of time windows with different tiered, time-based criteria. Steps 501 and 502 represent information inputs into FIG. 5A that are derived from the steps in FIG. 5B. Similarly, steps 503 and 504 represent information outputs from FIG. 5A that are input into the steps in FIG. 5B. Following the steps of FIGS. 5A and 5B, the system of the present invention is able to effectively manage the functions of charge and discharge throughout each time period provided, and maximize the production and consumption efficiency of the of system with regard to the criteria provided. In the example of TOU rates provided by a utility, following the steps of FIGS. 5A and 5B results in significantly improved price for electricity derived from the grid for the user. In the event that there are multiple time windows with different rates, it is important to establish a charge or discharge goal based on the calculation of the different charge and discharge profiles for each time window.

In another embodiment of the invention, the method can be enhanced by having the system use recorded consumption data to understand typical consumption patterns to further optimize the use of energy on not only the highest-tier time window, but also interim time windows. As such, the system described in FIGS. 5A and 5B can utilize recorded consumption patterns to further optimize the use of stored energy to reduce overall energy costs by understanding that the energy reserves allow for the use of stored energy during periods outside of the period defined by the highest tier-criteria.

The benefits of the present invention extend beyond just potential financial benefits to the user. By optimizing the management of energy at the user's local, the present systems and methods also reduce burden on the utility power grid during windows in which regional consumption is the highest and also alleviate excess energy in the utility power grid in windows in which regional consumption is the lowest. Further, utilizing capabilities such as the ability to anticipate use of EV charging loads at off-peak time windows, heightened efficiency is gained for both the user and utility power grid.

One of ordinary skill in the art will understand how to implement the embodiments of the present inventions in these applications to achieve the benefits of enhanced efficiency with respect to tiered, time-based criteria using the dynamic charging and discharging profiles described herein.

The above-described embodiments of the present invention are intended to be examples only. Alterations, modifications, and variations may be effected to the particular embodiments by those of skill in the art without departing from the scope of the invention, which is defined solely by the claims appended hereto.

What is claimed is:

1. A method of charging and discharging an energy storage system coupled to a renewable energy generation system based on a current percent state of charge, comprising the steps of:
    inputting four or more daily time periods into the energy storage system;
    assigning a top value time period and a second value time period based on time-of-use rates;
    identifying a prime charging time period immediately before the top value time period and secondary charging time period immediately before the second value time period;
    calculating a net profile for each time period based on its temporal proximity to the top value time period and the second value time period;
    upon entering the prime charging time period, setting a goal for a percent state of charge of the energy storage system that is above 90% state of charge and is based on (a) a current percent state of charge, (b) the net profile for said prime charging time period, (c) an amount of energy generated by said renewable energy generation system, and (d) an historical usage data of the energy storage system;
    upon entering the secondary charging time period setting a goal for a percent state of charge of the energy storage system that is above 80% state of charge and is based on (a) a current percent state of charge, (b) the net profile for said secondary charging time period, and (c) an amount of energy generated by said renewable energy generation system; and
    charging or discharging the energy storage system based on the difference between the current percent state of charge and the goal for said time period.

2. The method of claim 1, further comprising the step of:
    calculating an estimated charging power based on:
    (a) the current state of charge,
    (b) the goal for the percent state of charge of the energy storage system,
    (c) an amount of time remaining in the time period, and
    (d) a total storage capacity of the energy storage system; and
    charging the energy storage system at a rate equal to the estimated charging power.

3. The method of claim 2, further comprising the step of:
    setting a maximum allowed charging power and a minimum allowed charging power.

4. The method of claim 3, wherein the maximum allowed charging power is set by adding a power factor from said renewable energy generation system to a threshold charging power, and subtracting a concurrent consumption.

5. The method of claim 1, wherein the step of calculating said net profile for each time period takes into account an historical usage data of the energy storage system.

6. The method of claim 1, further comprising:
    recording an energy generation data set from said renewable energy generation system, and using said energy generation data set when calculating the net profile for each time period.

7. The method of claim 1, wherein the step of determining a unique charge profile further comprises evaluating a difference in available electricity rates for each time period.

8. The energy storage system of claim 2 wherein the charging power during the prime charging time period is increased above the rate of charge from said renewable energy generating system if said historical usage data of the energy storage system indicates that an increase is necessary to meet the goal for the percent state of charge by the end of the prime charging time period.

9. The energy storage system of claim 2 wherein the charging power during the secondary charging time period is increased above the rate of charge from said renewable energy generating system if said historical usage data of the energy storage system indicates that an increase is necessary to meet the goal for the percent state of charge by the end of the secondary charging time period.

10. The energy storage system of claim 8 wherein the number of time periods is five or more.

* * * * *